July 5, 1932. K. E. STUART 1,866,065
ELECTROLYTIC CELL
Filed April 25, 1930 3 Sheets-Sheet 1
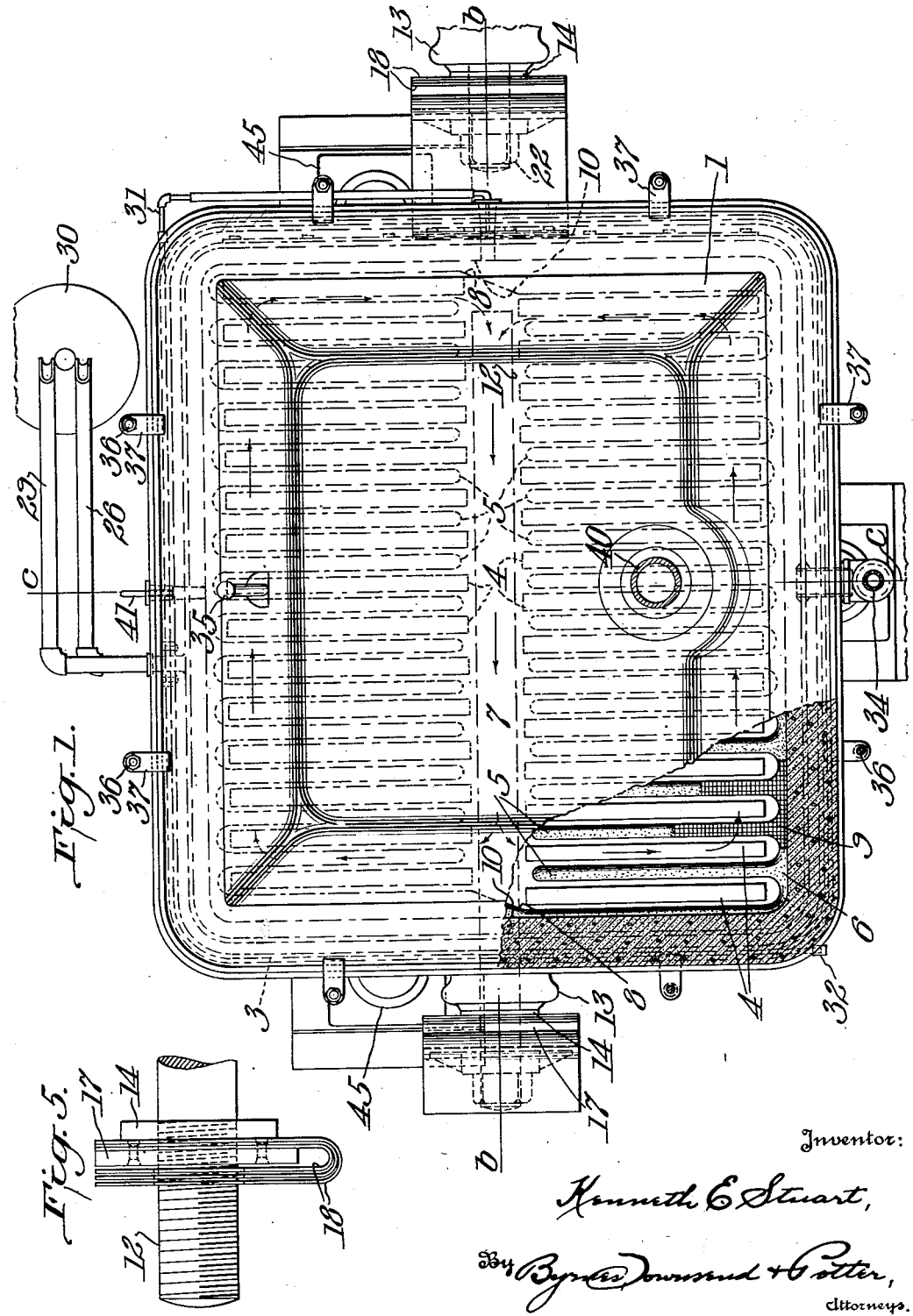
Inventor:
Kenneth E. Stuart,
By Byrnes Townsend & Potter,
Attorneys.

July 5, 1932. K. E. STUART 1,866,065
ELECTROLYTIC CELL
Filed April 25, 1930 3 Sheets-Sheet 2
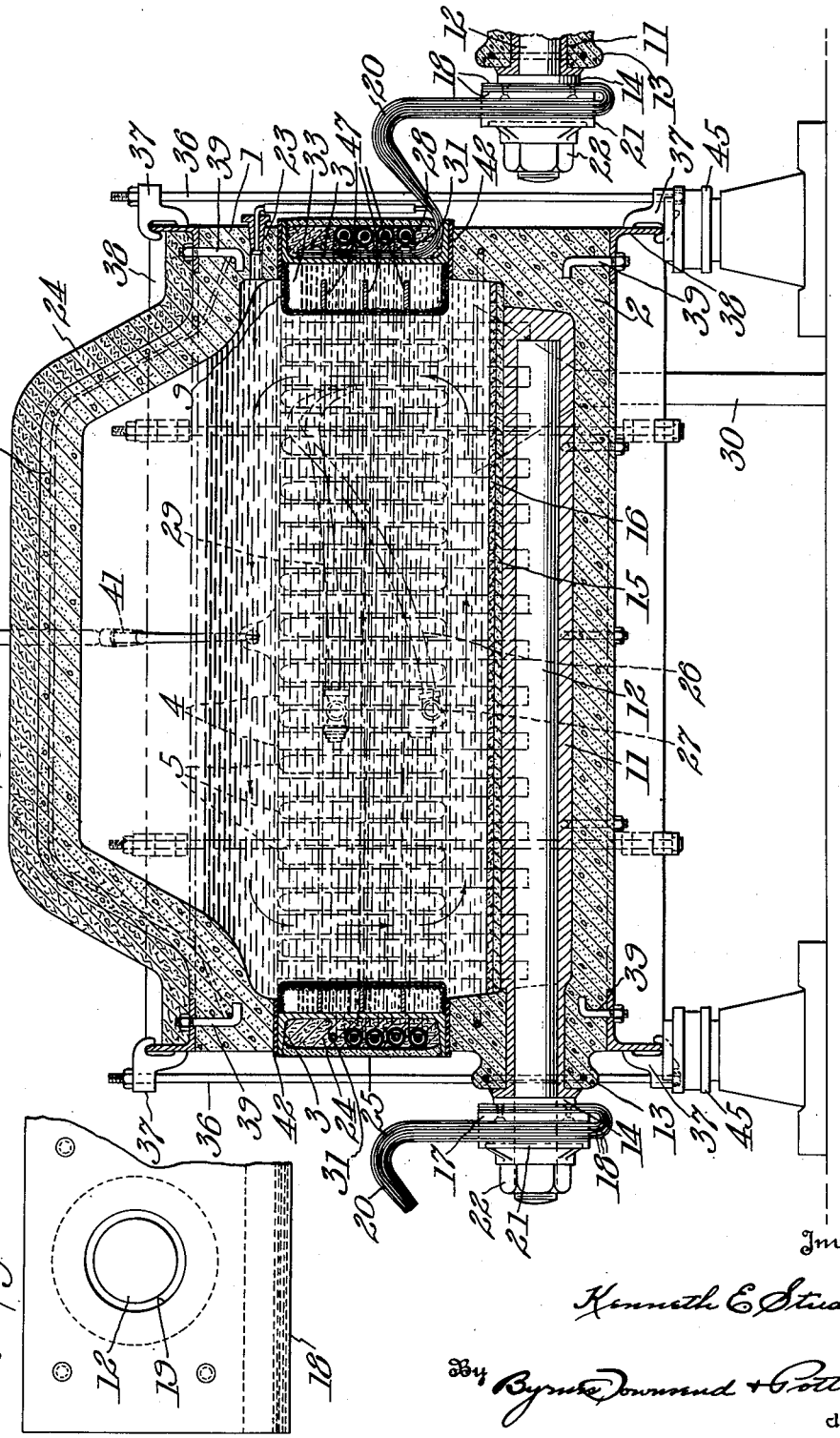
Inventor:
Kenneth E. Stuart,
By Byrnes, Townsend & Potter,
Attorneys.

July 5, 1932. K. E. STUART 1,866,065
ELECTROLYTIC CELL
Filed April 25, 1930 3 Sheets-Sheet 3
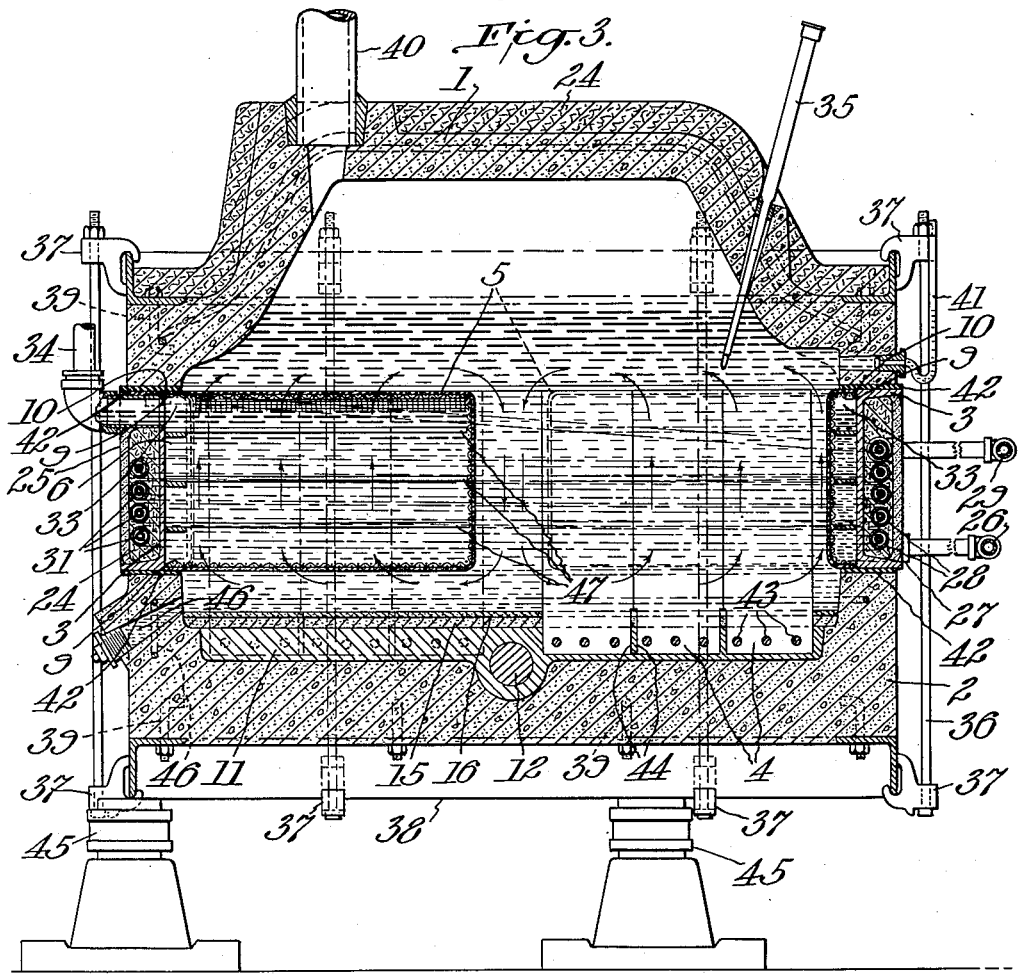
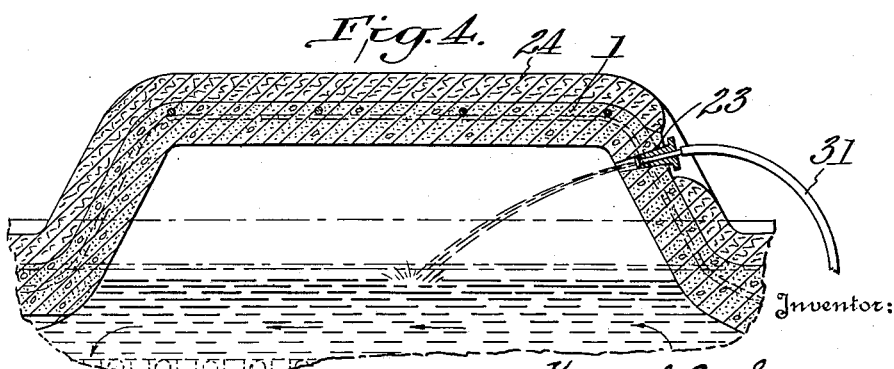
Inventor:
Kenneth E. Stuart,
By Byrnes Townsend & Potter,
Attorneys.

Patented July 5, 1932

1,866,065

UNITED STATES PATENT OFFICE

KENNETH E. STUART, OF NIAGARA FALLS, NEW YORK, ASSIGNOR TO HOOKER ELECTROCHEMICAL COMPANY, OF NEW YORK, N. Y., A CORPORATION OF NEW YORK

ELECTROLYTIC CELL

Application filed April 25, 1930. Serial No. 447,319.

This invention relates to electrolytic cells, and more particularly to cells for the electrolytic decomposition of water-soluble salts, such as the chlorides of potassium and sodium, as for the production of chlorine and sodium hydroxide, with liberation of hydrogen.

It is well known that the conditions making for high volt efficiency in such cells have heretofore been diametrically opposed to those making for high ampere efficiency and satisfactory output, which fact tends to fix a definite limit to overall or energy efficiency for a given type of cell. The explanation of this phenomenon is as follows:

One of the principal causes of reduced ampere efficiency in cells of this nature is the passage of chlorine through the diaphragm in solution in the brine, followed by its reaction with sodium hydroxide to form sodium chloride and sodium hypochlorite or sodium chlorate. Since the solubility of chlorine in brine decreases rapidly with increase in temperature, becoming practically nil at boiling temperature, it follows that high temperature favors high ampere efficiency. But high cell temperature has hitherto been obtainable only by expenditure of energy, either through voltage drop in the cell or through application of external heat, as by means of a steam jacket or by preheating of the feed brine. Thus, a cell operating to electrolyze sodium chloride at 4.6 volts will ordinarily show a temperature of about 85° C. or over, at which temperature the chlorates formed should amount to only a trace and the ampere efficiency should be 95% or better. But under these conditions the volt efficiency is only 50%, and the energy efficiency only 48%. The same cell, if operated at such a reduced current density as to bring the voltage down to 3.5 would show a temperature of about 70° C., with an ampere efficiency of about 92%. The energy efficiency of the cell under these conditions would be about 60%, a considerable saving in power as compared with the former case, but one that has been purchased at the expense of output. By preheating the feed brine, the temperature can be brought up again to 85° C. and the energy efficiency increased to about 62%, but if the energy supplied in preheating be taken into account the overall efficiency is no better than before. That is to say, 60% is about the commercial limit of overall efficiency hitherto realizable in alkali-chlorine cells.

My invention has for one of its objects to provide a cell which when operated at relatively low voltage will maintain a relatively high temperature without expenditure of energy for preheating the feed brine. This is accomplished by conserving the heat generated within the cell, which is done by (a) reducing the radiation from the cell, and (b) extracting heat from the effluent products and returning it to the cell.

In achieving this object, the greatest possible electrode surface consistent with free circulation of the anolyte and other practical considerations is crowded into the smallest possible volume; the cell is so proportioned as to give the lowest practicable ratio of surface to volume; and all external metallic surfaces, as well as much of the cell structure proper, e. g., the concrete walls, is covered with heat insulation or lagging. As the radiation from an ordinary cell amounts usually to one-third of the total heat generated, it is evident that any substantial reduction in radiation must result in a considerable elevation in temperature. The means adopted for preventing escape of heat in the effluent products will be discussed later.

A further advantage of this compact construction is that, since the interior of the cell is substantially filled with electrodes, the electrode surface is approximately proportional to the volume, or cube of the linear dimension of the cell, whereas in types of cells hitherto known, and notably the circular type of cell, it is only approximately proportional to the square of the linear dimension. In consequence of this fact, the cell of my invention can be built in any desired size of unit, as for example ten thousand amperes, whereas the circular cell of conventional type is limited in size to a unit of about 1,000 amperes. In the well known elongated rectangular type of cell, clearance must be allowed for lateral withdrawal of electrodes, whereas in the cell of my invention provision is made for vertical withdrawal of electrodes. In any unit therefore, and particularly in the larger units, the cell of my invention is highly economical of floor space.

Another object of my invention is to simplify the construction of the cell and to minimize the labor of diaphragm and anode renewal. Thus, the anodes instead of projecting through the top of the cell, which involves packing around each individual anode and making a bus bar connection to it, have their lower ends embedded in a solid slab of lead, into which is also embedded a single large copper bus bar, which is carried out through an opening in the bottom of the cell, so that there is only one opening to be packed, and this is readily made tight by caulking the lead. This construction has the further advantage, as compared with the circular type of cell for example, that the anodes do not have to be disturbed for diaphragm renewal.

My invention has for another of its objects to cause a circulation in the anolyte in a plane or planes perpendicular to that of the natural circulation caused by the evolution of chlorine. This is accomplished by utilizing the kinetic energy of the inflowing feed brine, which for this purpose, is introduced horizontally. This circulation is rendered the more effective by the proportioning of the cell. The object of this circulation is to distribute the incoming salt or saline solution equally to every portion of the electrode surface.

Another object of my invention is to eliminate all unnecessary contact connections between cells, and provide the greatest practicable contact surface for the single indispensible connection, in order to minimize voltage drop between cells.

This cell is furthermore designed to utilize to the fullest extent the advantages inherent in the special or deposited diaphragm structure which forms the subject matter of co-pending applications in my name, i. e., applications Ser. No. 275,860, filed May 7, 1928, Ser. No. 419,157, filed January 7, 1930, and Ser. No. 425,001, filed January 31, 1930.

Referring now to the drawings:

Fig. 1 is a top plan view of a preferred form of cell in accordance with my invention, a portion of the cover being broken away to reveal the interior.

Fig. 2 is a vertical sectional view on the line $b$—$b$ of Fig. 1.

Fig. 3 is a vertical sectional view on the line $c$—$c$ of Fig. 1.

Fig. 4 is a broken vertical sectional view, showing an alternative method of admitting the feed brine to the cell.

Fig. 5 is an elevational view on an enlarged scale of a detail of the bus bar terminal, the clamping plate and nut being removed and Fig. 6 is an end elevation of the same.

Referring to Figs. 1, 2 and 3:

It will be seen that the cell comprises a removable concrete cover or top 1, a concrete bottom 2, (with which the anode assembly is associated) and between the two a cathode structure comprising the steel frame 3.

The electrodes comprise, for anodes, a plurality of flat slabs or blades 4, 4, preferably of graphite, placed in parallel alignment in an upright position, alternating with elongated and flattened hollow cathode members, 5, 5, of perforated metal or woven wire screen, covered with a diaphragm of fibrous material and placed midway between said anodes, with suitable clearance between, the outer open ends of said cathode members communicating with a common header or passage 6, 33 for reception of the liquid and the gaseous cathodic products of decomposition, respectively.

The cathode structure comprises the main frame 3, consisting of a structural steel channel bent around with flanges outward and welded to form a hollow square, with rounded corners of the shape shown in Fig. 1; the inner supporting frame 47 for holding the cathode members in alignment and reinforcing them against deformation; and the active cathode members 5, 5, aforesaid. These latter are arranged along two opposite sides of the frame 3, with their closed ends facing inward and their other ends opening into the passage 6. Between the two rows of cathode members is a space 7, the purpose of which will be explained later. The cathode members 5 on opposite sides of the frame 3 are staggered so that individual cathode members when damaged or worn may be cut out and replaced. These cathode members may be formed of stamped and perforated metal, but in practice I find that screen woven of double crimped steel wire answers the purpose very well, as it can be either stretched or compressed into the desired shape. This screen is of course covered by a diaphragm of fibrous material, preferably asbestos, which may be deposited in accordance with the method described in my co-pending applications Ser. Nos. 275,860, 419,157 and 425,001.

It is of the utmost importance to avoid any extended unperforated metallic surface within the cell in electrical contact with the cathode, for the reason that such surface cannot conveniently be covered by diaphragm, and if it were electric energy would be uselessly expended in production of sodium hydroxide which as it could not get away, would re-enter the anode compartment and be converted into sodium chlorate etc., and lost. For this reason, any such unperforated surface would have to be protected against electrolytic action, and the covering employed for such protection would be liable to crack or disintegrate. I therefore use only the woven wire screen under the conditions assumed, and the surface 8 at the ends of the cell as well as the upper and lower flat surfaces 9 and the edges of the cathode members are of this material. Moreover, the flat surfaces 9 are made continuous with the upper and lower faces respectively of the channel 3, and the seams 10 where the wire screen butts against and is welded to the channel, are overlapped by the concrete of the top 1 and bottom 2 respectively. The diaphragm deposited as aforesaid extends to this seam. A gasket 42, preferably of some plastic material such as putty or bitumen, is provided between the concrete and the cathode and this of course likewise overlaps the seam 10 and adjacent diaphragm. Any anolyte leaking under this gasket therefore encounters normal diaphragm for a considerable distance and is normally acted on by the electric current.

The anode assembly comprises the anodes 4, 4, having their lower ends embedded in the lead slab 11, which is formed by pouring the molten lead into the mold constituted by the concrete bottom 2 itself. In the case illustrated, the graphite blades forming the anodes are disposed in sets of three. Each blade has a number of holes 43 drilled through it near the lower end and between each pair of blades a notch 44 is formed. The lead flowing through these holes and notches shrinks in solidifying and exerts pressure against the graphite. A copper bus bar 12, which may be round or of any other convenient cross section, having been previously tinned, is likewise embedded in the lead slab 11, and extends out through an opening in the concrete for connection with the source of current. A boss 13 is formed in the concrete surrounding the opening just referred to and a collar 14 is formed upon the copper bus bar 12. Between the bus bar 12, also between the collar 14, and the concrete, the molten lead is allowed to flow, forming a packing that can be caulked to prevent leakage. The surface of the lead slab 11 is protected by a covering of cement, 15, which is in turn protected by a coating of bitumen, 16, or other suitable material. The lead slab 11 is, of course, anodic. If not insulated, chlorine would be evolved upon its surface, the lead would be corroded, and there would be a slight loss of chlorine efficiency, but the efficiency as expressed in production of sodium hydroxide would not be affected, as it would be if this lead were cathodic. The insulation of the lead slab 11 is therefore principally to prevent loss of lead, and such insulation is easily effected in the manner described.

The electrical connection from cell to cell is as follows:

A copper plate 17 (Figs. 1, 2, 5 and 6) is mounted upon the projecting end of bus bar 12. Against the rear side of this plate and lying between it and the collar 14 are riveted a number of flexible copper laminations 18. These are bent around in a U shape to bring them in front of the plate 17 and provided with the clearance hold 19 (Fig. 6) through which the end of the bus 12 passes. The plate 17, laminations 18 and collar 14 are sweated together so as to become, electrically speaking, a unit. The copper laminations 20 are similarly riveted and sweated to the channel frame 3 of the adjacent cell, and bent into a reverse curve as shown in Fig. 2 for greater flexibility. The laminations 20 of one cell alternate between the laminations 18 of the next adjacent cell and are clamped together between them and against the plate 17 by means of the iron clamping plate 21 and nut 22. Thus, there is only one contact connection between cells, and the contact surface is multiplied in proportion to the number of laminations. By this means the voltage drop between cells can be rendered negligible, which is a matter of great importance, as the low voltage characteristic of this cell might be largely nullified by voltage drop at a poorly designed contact.

Referring to Fig. 1:

The object in arranging the electrodes 4 and 5 in two rows or banks with a clearance between them is twofold: It may easily be shown that the radiation surface of a rectangular cell will be minimum when its length and breadth are equal. Thus, by this arrangement with electrodes of the proportion shown, the cell is made approximately equilateral, and the radiation surface is reduced, as compared with the radiation surface that would result from placing these electrodes in a single row, by an amount approximately equivalent to the length of one of these banks multiplied by the height of the cell. The second object sought in this arrangement of the electrodes is better distribution throughout the cell of the salt contained in the infeed brine. It is well known that there is a definite depletion of salt in the anolyte, which will be found, after several hours operation, to contain less salt per unit of volume than was originally fed to the cell. For this reason, in order to maintain saturation within the cell, it is desirable to feed more salt than can be carried in solution in the feed brine. This may be done in accordance with the method described in United States patent to Lyster and Stuart, No. 1,388,474, dated August 23, 1921. Whether such excess salt is fed or not, however, it is important that the anolyte be continuously circulated, for otherwise the salt depletion at points remote from the infeed will be so great as to adversely affect the efficiency of the cell. The evolution of chlorine upon the surface of the anode causes an upward circulation between the electrodes, and it is necessary to provide a passage for the return of the anolyte beneath the same. The space 7 between the two banks of electrodes serves this purpose, and also another, which I will now describe:

Hitherto it has been customary to introduce the infeed brine vertically at the top of the cell. In cells designed for several thousand amperes, the infeed is a considerable stream of brine, which may be either a large low velocity stream or a small high velocity stream. When employing the system of brine feed disclosed in the patent to Lyster and Stuart above referred to, in which the brine is fed in measured quantity through a calibrated orifice, it becomes easy to admit the brine to the cell in a small high velocity stream, as through the nozzle 23. By directing this stream horizontally in line with the space 7, I utilize its kinetic energy to set up a circulation in a plane or planes transverse to that of the natural circulation. In Fig. 3 the natural circulation is indicated by the arrows. In Fig. 1 the transverse circulation set up by the means just described in the horizontal plane is illustrated; and in Figs. 2 and 4 is shown the transverse circulation set up in the same way in the vertical plane. This method is the more effective in setting up transverse circulation because of the approximately square shape of the cell. In this way the infeed brine is distributed to every portion of the electrode surface.

In Fig. 1 the infeed stream is shown as introduced below the surface level of the anolyte. Since the brine flowing through the pipe coil 31 is in electrical contact with the cathode, its introduction below the surface level theoretically permits some current to flow through the brine stream and to produce sodium hydroxide in the coil. Any sodium hydroxide thus produced is carried into the cell, where it comes into contact with chlorine and is converted into sodium chloride, hypochlorite and chlorate, and lost. Any sodium hydroxide formed in the coil therefore represents lost efficiency. However, the percentage of energy lost in that way is negligible. Nevertheless, in Fig. 4, I show an alternative method of introducing the infeed brine above the surface level of the anolyte at such an angle that the transverse circulation is set up as before, but at such a height above the surface that the stream is broken, thus avoiding electrical contact and consequent production of sodium hydroxide in the coil with the resulting slight loss of efficiency.

Referring to Figs. 2, 3 and 4:

24 is a covering of heat insulating material or lagging, which may consist of a fibrous material such as asbestos, held together by a binder such as cement. 25 is a protective and water-proofing covering on the lagging 24. This may consist of a thin layer of neat cement. The object of the layer 25 is to protect the lagging 24 against damage during the depositing of the diaphragm upon the cathode screen, as aforesaid, and also to prevent absorption of the liquid in which the fibrous diaphragm material is suspended during this operation. The surface of the cement layer may be further water-proofed by a coating of paint, which may be of asphalt in a solvent or bitumen applied hot.

Referring to Figs. 1, 2 and 3:

26 is a percolation pipe connected to the passage 6, in which the cathodic products of decomposition are collected, through the special fitting 27. The point of connection is as near as possible to the bottom of the cathode. To the fitting 27, and communicating with the percolation pipe 26, is connected one end of a pipe coil 28, which in the case illustrated, is housed within the flanges of the channel frame 3, and makes four complete turns about this frame, terminating in the second percolation pipe 29. If these two percolation pipes, 26 and 29, are placed at the same level, the cathode liquor in the passage 6 will stand at substantially the level defined by the highest point of these percolation pipes, and the percolating cathode liquor will flow principally out of the pipe 26, since this offers the shortest path, falling finally into the receiving funnel 30 (the distance of fall being made sufficient to assure the breaking up of the stream to avoid establishing a by-pass around the cell for the current). If, however, the pipe 29 be lowered slightly relative to the pipe 26, a head will be established upon the coil 28 and a definite proportion of the liquor will flow through the coil and out of the pipe 29 into the funnel 30. If the pipe 29 be lowered still more, a point will be reached at which all the liquor percolating will flow out of the pipe 29.

Through the interior of the pipe coil 28, for its entire length, passes the smaller pipe 31. The feed brine for the operation of the cell is connected at the point 32 to the end of the pipe 31 which enters the coil 28 at the point at which the cathode liquor leaves this coil. The pipe 31 at the other end is connected to the nozzle 23. Thus the flow of the brine is counter-current relative to that of the cathode liquor and, by this arrangement, a large proportion of the heat of the effluent may be transferred to the infeed brine and returned to the cell. This action will be hereinafter referred to as "regeneration". Moreover, the proportion of the heat so transferred can be regulated by the position of the pipe 29 relative to the pipe 26. This is important as the cell might otherwise be caused to boil, which would throw down salt and obstruct the pipe coil 28. In order to facilitate control of the cell temperature, the thermometer 35 (Fig. 3) is inserted through a hole provided for this purpose in the concrete top 1.

The pipe coil 28 is embedded in and covered by the lagging 24. Moreover, the pipe coil 28, constitutes a protective screen around the cathode plate 3, tending to intercept heat flowing outward through the lagging and transfer it to the infeed brine.

In Figs. 2 and 3 the surface level of the cathode liquor is shown slightly below the top of the cathode, leaving the passage 33 for outflow of the hydrogen to the discharge pipe 34. This passage 33 is desirable, but not essential, as the hydrogen will in any event form its own passageway, the only difference being that in the latter case the hydrogen will be under a slight hydraulic pressure and its flow will not be so smooth. When the anodes have become worn thin, if the current be maintained, the voltage will naturally be higher. Under these conditions, in a cell of this type, a point may be reached at which no heat regeneration is required. In such case the pipe 26 may be lowered until the cathode passage 6 is entirely emptied of liquid and filled with hydrogen. In order to prevent escape of hydrogen, the pipe 26 is curved so as to provide a liquid seal.

The lower surface of the concrete top 1 and upper surface of the concrete bottom 2 are formed against a machined iron plate, and are therefore smooth and flat. The contiguous surfaces of the cathode frame 3 may likewise be machined. Thus there are provided true surfaces between which joints sufficiently tight to hold the light pressure of only a few inches of head are readily assured, with the aid of the gaskets 42 of any convenient material, such as bitumen or putty, the whole being clamped together by means of the tie rods 36 and clamp hooks 37, hooking over the angle frames 38, which are bent so that their flanges are flush with the edges of the concrete top 1 and bottom 2, respectively, and anchored to the concrete by the bolts 39. It will be seen that when the top 1 is removed, the cathode and anode members are in full view and as the cathode slides freely upon the concrete bottom, adjustment of the clearance between anodes and cathode members can be made visually.

The weight of the cell is supported by the lower of the two angle frames 38, which rest upon the insulators 45. 46 is an opening for draining the cell. The pipe 40 in the concrete top serves for exit of the chlorine, and the sight glass 41 gives an indication of the surface level within the cell.

I claim:

1. An electrolytic cell comprising a chamber adapted to contain fluid electrolyte, anode and cathode members in said chamber, a conduit for supplying electrolyte to said chamber, and a conduit for withdrawing a product of electrolysis from said chamber, portions of said conduits being arranged in heat transfer relation to each other and to a wall of said chamber.

2. An electrolytic cell comprising a chamber adapted to contain fluid electrolyte, anode and cathode members in said chamber, a conduit for supplying electrolyte to said chamber, and a conduit for withdrawing a product of electrolysis from said chamber, portions of said conduits being arranged in counter-current heat transfer relation to each other and to a wall of said chamber.

3. An electrolytic cell comprising a chamber adapted to contain fluid electrolyte, anode and cathode members in said chamber, a conduit for supplying electrolyte to said chamber, and a conduit for withdrawing a product of electrolysis from said chamber, portions of said conduits being arranged in heat transfer relation to each other and to a wall of said chamber, the metallic exterior of said chamber being at least partially covered by a layer of heat insulating material.

4. An electrolytic cell comprising a chamber adapted to contain fluid electrolyte, anode and cathode members in said chamber, a conduit for supplying electrolyte to said chamber, and a conduit for withdrawing a product of electrolysis from said chamber, portions of said conduits being positioned one within the other and in heat transfer relation to a wall of said chamber.

5. An electrolytic cell comprising a chamber adapted to contain fluid electrolyte, anode and cathode members in said chamber, a layer of heat insulating material on a wall of said chamber, a pipe for withdrawing a product of electrolysis from said chamber a portion of which is in heat transfer relation to said wall and covered by said layer of heat insulating material, and a pipe for the introduction of electrolyte into said chamber positioned within said portion of said first named pipe.

6. An electrolytic cell comprising a chamber having heat insulated walls, electrodes positioned within said chamber, the shape of said chamber and the arrangement of the electrodes therein being such that the electrode surface area is in direct proportion of the chamber, means for introducing electrolyte into said chamber, means for withdrawing a product of electrolysis from said chamber, and means for transferring heat from said product to said electrolyte.

7. An electrolytic cell comprising a chamber of substantially square horizontal section having a layer of heat insulating material on a wall thereof, electrodes positioned within said chamber and so arranged therein that the electrode surface area is in direct proportion to the volume of said chamber, a pipe for the introduction of electrolyte into said chamber, and a pipe for withdrawing a product of electrolysis from said chamber, said pipes arranged in heat transfer relation to each other and to said wall of said chamber.

8. An electrolytic cell comprising a chamber, a pipe, a portion of which is positioned in heat transfer relation to a wall of said chamber for withdrawing a product of electrolysis therefrom, a pipe for supplying electrolyte to said chamber, a portion of which is arranged in heat transfer relation to said portion of the first mentioned pipe and means for regulating the quantity of said product of electrolysis passing through said portion of said first mentioned pipe.

9. An electrolytic cell comprising an anode assembly constituting a base member, a superposed detachable cathode assembly providing at least a portion of the side walls of said cell and carrying an exterior layer of heat insulating material, a removable cover member resting upon said cathode assembly and pipes for supplying electrolyte to and withdrawing a product of electrolysis from the cell in heat transfer relation to each other and to said wall.

10. An electrolytic cell comprising an anode assembly, including a non-conductive base member, a conductive member supported upon said base member, a non-conductive layer above said conductive member, non-metallic anode plates projecting vertically from electrical contact with said conductive member upwardly through said non-conductive layer, a cathode assembly removably supported upon said anode assembly, said cathode assembly comprising an outer wall within which are supported a plurality of vertically disposed cathode plates, and a cover member removably supported upon said cathode assembly.

11. An electrolytic cell comprising an anode assembly including a non-conductive base member, a metallic conductive member supported upon said base member, a non-conductive impervious layer above said metallic conductive member, a plurality of vertically disposed parallel non-metallic anode plates penetrating said non-conductive layer and projecting into said metallic conductive member, and a cathode assembly comprising an annular peripheral shell, a plurality of vertically disposed parallel cathode members supported within said shell and adapted to alternate with said anode plates when said cathode assembly is superposed on said anode assembly.

12. An electrolytic cell comprising an anode assembly including a non-conductive base member, a metallic conductive member supported upon said base member, a non-conductive impervious layer above said metallic conductive member, a plurality of vertically disposed parallel non-metallic anode plates arranged in two parallel banks, the plates of each bank being in staggered relation to the plates of the other bank, said plates penetrating said non-conductive layer and projecting into said metallic conductive member, and a cathode assembly comprising an annular peripheral shell, a plurality of vertically disposed parallel cathode members supported within said shell arranged in two parallel banks and adapted to alternate with said anode plates when said cathode assembly is superposed on said anode assembly.

13. An electrolytic cell comprising an anode assembly including a non-conductive base member, a metallic conductive member supported upon said base member, a non-conductive impervious layer above said metallic conductive member, a plurality of vertically disposed parallel non-metallic anode plates arranged in two parallel banks, said plates penetrating said non-conductive layer and projecting into said metallic conductive member, and a cathode assembly comprising an annular peripheral shell, a plurality of vertically disposed parallel cathode members supported within said shell arranged in two parallel banks and adapted to alternate with said anode plates when said cathode assembly is superposed on said anode assembly, said parallel banks of alternating anode plates and cathode members defining a medial space between them and means for inducing a flow of electrolyte longitudinally in said space.

14. An electrolytic cell comprising an anode assembly including a non-conductive base member, a metallic conductive member supported upon said base member, a non-conductive impervious layer above said metallic conductive member, a plurality of vertically disposed parallel non-metallic anode plates arranged in two parallel banks, said plates penetrating said nonconductive layer and projecting into said metallic conductive member, and a cathode assembly comprising an annular peripheral shell, a plurality of vertically disposed parallel cathode members supported within said shell arranged in two parallel banks and adapted to alternate with said anode plates when said cathode assembly is superposed on said anode assembly, said parallel banks of alternating anode plates and cathode members defining a medial space between them and means for projecting electrolyte in a substantially horizontal direction longitudinally of said space.

15. In an electrolytic cell a cathode assembly comprising a substantially rectangular peripheral shell, and a bank of flat cellular parallel spaced cathode members supported along each of two opposite sides of said shell and opening into a passage defined by said cathode members and said shell, said cathode members lying in planes perpendicular to the plane of said shell, said two banks of cathode members defining an open space between them.

16. In an electrolytic cell a cathode assembly comprising a substantially rectangular peripheral shell, and a bank of flat cellular parallel spaced cathode members supported along each of two opposite sides of said shell and opening into a passage defined by said cathode members and said shell, said cathode members lying in planes perpendicular to the plane of said shell and the members of each bank standing opposite the spaces between the members of the other bank, said two banks of cathode members defining an open space between them.

17. In an electrolytic cell a cathode assembly comprising a substantially rectangular peripheral shell, and a bank of flat cellular parallel spaced cathode members formed of a continuous foraminous metallic web supported along each of two opposite sides of said shell and opening into a passage defined by said cathode members and said shell, said cathode members lying in planes perpendicular to the plane of said shell and the members of each bank standing opposite the spaces between the members of the other bank, said two banks of cathode members defining an open space between them.

18. An electrolytic cell including an anode assembly comprising a non-conductive layer, a bus bar disposed below said layer and a plurality of anode plates projecting upwardly in parallel relation from electrical contact with said bus bar through said layer, a cathode assembly adapted to rest upon said layer and horizontally adjustable in all directions with respect thereto, said cathode assembly comprising a peripheral shell within which is supported a plurality of flat cellular parallel spaced cathode members having borders continuous with the upper and lower surfaces of said shell, the edges of said borders abutting against and secured to the upper and lower edges of said shell, a cover member adapted to rest upon said shell, the seams between said shell and said borders being overlapped by a layer of non-conductive, impervious plastic material.

19. An electrolytic cell including an anode assembly, a cathode assembly comprising a peripheral shell adapted to rest upon said anode assembly, and a cover member adapted to rest upon said shell, said cathode assembly comprising also cathode members formed of a foraminous metallic web, the borders of which are continuous with the upper and lower surfaces of said shell, and a layer of non-conductive, impervious plastic material overlapping the seam between said shell and said borders.

20. In an electrolytic cell an anode member comprising a non-conductive base, a slab of lead supported upon said base, a copper bus bar embedded in said slab of lead and projecting from said base, a layer of non-conductive material overlying said slab of lead and a plurality of graphite slabs projecting vertically upward through said layer of non-conductive material and having their lower edges embedded in said slab of lead.

21. In an electrolytic cell an anode member comprising a non-conductive base, a slab of lead supported upon said base, a copper bus bar embedded in said slab of lead and projecting from said base, a layer of non-conductive material overlying said slab of lead, and a plurality of graphite slabs projecting vertically through said layer of non-conductive material and having their lower edges embedded in said slab of lead, the embedded portions of said plates having openings therein and vertical notches extending upwardly from their lower edges to the upper surface of said layer of non-conductive material.

22. In an electrolytic cell, an anode assembly as defined in claim 21, in which the non-conductive base has side walls extending upwardly around the slab of lead into impervious contact with the layer of non-conductive material, and the copper bus bar extends outwardly through an opening in one of said side walls, the space between the wall of said opening and said bus bar being caulked with lead.

23. In apparatus comprising a plurality of electrolytic cells, an electrical connector between cells comprising a group of flexible metal laminæ attached to the anode of one of said cells, a similar group of flexible metal laminæ attached to the cathode of another of said cells, the laminæ of each group being interleaved with the laminæ of the other group.

In testimony whereof, I affix my signature.

KENNETH E. STUART.